US011726436B2

(12) United States Patent
Hart et al.

(10) Patent No.: US 11,726,436 B2
(45) Date of Patent: Aug. 15, 2023

(54) SYSTEM AND METHOD FOR CONTROLLING A POWER GENERATING SYSTEM

(71) Applicant: General Electric Renovables Espana, S.L., Barcelona (ES)

(72) Inventors: Patrick Hammel Hart, Ballston Lake, NY (US); Enno Ubben, Steinfurt (DE); Charles Joseph Kosuth, Asheville, NC (US); Alev Akbulut, Reine (DE)

(73) Assignee: General Electric Renovables Espana, S.L., Barcelona (ES)

( * ) Notice: Subject to any disclaimer, the term of this patent is extended or adjusted under 35 U.S.C. 154(b) by 125 days.

(21) Appl. No.: 17/406,213

(22) Filed: Aug. 19, 2021

(65) Prior Publication Data

US 2023/0056981 A1    Feb. 23, 2023

(51) Int. Cl.
*G05B 13/04* (2006.01)
*F03D 7/04* (2006.01)
*F03D 7/02* (2006.01)
*H02J 3/38* (2006.01)

(52) U.S. Cl.
CPC ......... *G05B 13/042* (2013.01); *F03D 7/0284* (2013.01); *F03D 7/048* (2013.01); *H02J 3/381* (2013.01); *H02J 2300/20* (2020.01)

(58) Field of Classification Search
CPC .......... G05B 13/042; H02J 3/381; H02J 3/16; Y02E 10/76; F03D 7/0284; F03D 7/047; F03D 7/048
See application file for complete search history.

(56) References Cited

U.S. PATENT DOCUMENTS

| 7,531,911 B2 * | 5/2009 | Rivas | H02J 3/381 290/55 |
| 7,606,638 B2 * | 10/2009 | Fortmann | F03D 9/257 290/44 |
| 7,839,024 B2 | 11/2010 | Cardinal et al. | |
| 8,041,465 B2 * | 10/2011 | Larsen | H02J 3/381 700/298 |

(Continued)

OTHER PUBLICATIONS

EP Search Report for EP application No. 22190610.0, dated Feb. 13, 2023, 5 pages.

*Primary Examiner* — Pedro J Cuevas
(74) *Attorney, Agent, or Firm* — Dority & Manning, P.A.

(57) ABSTRACT

A system and method are provided for controlling a power generating subsystem connected to a power generating system at a point of interconnection (POI). A subsystem controller receives a feedback first data signal corresponding to an electrical parameter for reactive power or power factor contributed by the power generating subsystem to the POI, the first data signal having a first signal fidelity. The subsystem controller receives a second data signal indicative of the electrical parameter measured at the power generating subsystem and having a second signal fidelity higher than the first signal fidelity. The subsystem controller generates a correlation value between the first and second data signals and applies the correlation value to modify a setpoint value for the electrical parameter at the POI. The subsystem controller uses the modified setpoint value and the second data signal to generate a setpoint command for the power generating subsystem.

16 Claims, 5 Drawing Sheets

(56) References Cited

U.S. PATENT DOCUMENTS

| | | | |
|---|---|---|---|
| 8,901,764 B2* | 12/2014 | Bech | H02P 31/00 290/55 |
| 8,912,675 B2* | 12/2014 | Mata | F03D 7/0284 290/34 |
| 9,046,077 B2* | 6/2015 | Kirchner | F03D 7/0284 |
| 9,347,429 B2* | 5/2016 | Nielsen | H02J 3/381 |
| 9,368,971 B2* | 6/2016 | Ellena | H02J 3/38 |
| 9,581,139 B2* | 2/2017 | Fortmann | F03D 9/257 |
| 9,660,448 B2* | 5/2017 | Ellena | H02J 3/16 |
| 9,859,710 B2 | 1/2018 | Garcia | |
| 10,027,118 B2* | 7/2018 | Ubben | H02J 3/18 |
| 10,050,447 B2* | 8/2018 | Burra | H02J 3/381 |
| 10,428,797 B2* | 10/2019 | Scott | F03D 7/047 |
| 10,566,799 B2* | 2/2020 | Beekmann | H02J 3/38 |
| 10,767,630 B1* | 9/2020 | Venkitanarayanan | F03D 7/028 |
| 10,989,169 B1* | 4/2021 | Kosuth | H02J 3/381 |
| 11,177,657 B1* | 11/2021 | Khatib | H02J 3/241 |
| 11,329,487 B2* | 5/2022 | Hart | H02J 13/00002 |
| 2005/0046196 A1* | 3/2005 | Larsen | H02J 3/50 290/44 |
| 2009/0218817 A1* | 9/2009 | Cardinal | H02J 3/16 290/55 |
| 2010/0025994 A1* | 2/2010 | Cardinal | F03D 7/0284 290/44 |
| 2010/0094474 A1* | 4/2010 | Larsen | H02J 3/381 700/298 |
| 2010/0109447 A1* | 5/2010 | Achilles | H02J 3/381 307/153 |
| 2011/0112697 A1 | 5/2011 | Arinaga et al. | |
| 2012/0101643 A1* | 4/2012 | Kirchner | F03D 9/255 700/287 |
| 2012/0136494 A1 | 5/2012 | Kirchner | |
| 2015/0137518 A1* | 5/2015 | Yin | F03D 7/048 290/44 |
| 2015/0295529 A1* | 10/2015 | Rose, Jr. | F03D 9/25 290/44 |
| 2016/0308369 A1* | 10/2016 | Gupta | H02J 3/16 |
| 2017/0338652 A1* | 11/2017 | Ubben | H02J 3/1821 |
| 2019/0010925 A1* | 1/2019 | Scott | F03D 7/0284 |
| 2021/0279643 A1* | 9/2021 | Koduru | G06F 18/285 |
| 2021/0408798 A1* | 12/2021 | Hart | H02J 13/00006 |
| 2023/0012038 A1* | 1/2023 | Iyer | H02J 13/00002 |
| 2023/0045585 A1* | 2/2023 | Hart | H02J 3/48 |

* cited by examiner

SYSTEM AND METHOD FOR CONTROLLING A POWER GENERATING SYSTEM

FIELD

The present disclosure relates in general to power generating systems, and more particularly to systems and methods for controlling power generating systems having power generating subsystems.

The subject matter of this disclosure relates to U.S. patent application Ser. No. 16/911,476 filed on Jun. 25, 2020, and U.S. patent application Ser. No. 17/393,649 filed on Aug. 4, 2021, which are incorporated herein by reference for all purposes.

BACKGROUND

Renewable power is considered one of the cleanest, most environmentally friendly energy sources presently available, and power generating facilities that include renewable power assets have gained increased attention in this regard. One example of such a renewable power asset is a wind turbine. Modern wind power generation systems typically take the form of a wind farm having multiple such wind turbine generators that are operable to supply power to a transmission system providing power to an electrical grid.

In modern renewable power applications, multiple power generating subsystems, such as multiple wind farms, may be coupled together at a point of interconnection (POI), such as a POI for an electrical grid. As interest in renewable power has increased, the number of power generating subsystems regulated at the single POI has increased. As a result, interactions between the multiple power generating subsystems have increased such that the output of one power generating subsystem may affect the other power generating subsystems coupled to the same POI. Accordingly, efficient regulation of each of the power generating subsystems may require accurate and timely collection of data concerning electrical parameters at the POI.

Of particular concern is voltage regulation at the POI, where one wind farm may adversely interact with another if configurations of each plant are not carefully coordinated. For example, consider the situation wherein two wind farms (with respective substations) operate within five miles of each other, and each wind farm has a point of measurement at its own substation. The combined output of the two wind farms may be connected to the utility grid at the POI by, for example, a fifteen mile long transmission line. The point of regulation for voltage for both wind farms is at the intersection of the utility grid and the long transmission line. Conventionally, a "line drop compensation" functionality would be used to estimate losses between the point of measurement (at the substation) and the point of regulation (at POI). However, this estimation is convoluted by the fact that there are two sources of reactive power that have an impact on voltage observed at all points within the electrical system. As more generators (wind farms, solar farms, energy storage, fossil fuel, etc.) are installed in the region and connected at the POI, more installations will attempt to perform regulation of the same point, making this estimation more difficult to perform accurately.

One approach for regulating the power generating subsystems is to obtain direct measurement at the POI of the electrical parameter used in the regulation scheme. However, in many instances, the POI is a component of the electrical grid and installation of sensors by the power generating subsystem operators may not be permitted. Accordingly, information concerning the electrical parameters of the POI may be provided by the POI operator, with the power generating subsystem operators having little to no control over the fidelity of the information received from the POI operator.

Accordingly, the information received from POI operator may be of a lower fidelity than would otherwise be desirable for the efficient regulation of each power generating subsystem. As such, it is desirable to facilitate the efficient regulation of each power generating subsystem despite utilizing the low-fidelity information regarding the electrical parameters at the POI.

The network/utility operator must maintain and regulate voltage throughout its system. One means to achieve this is through control of reactive power production and consumption by generators tied to the system at the POI. These reactive power requirements may be dictated to the wind farm operators in a number of ways. The simplest is by a fixed power factor wherein the wind farm is required to operate at such fixed power factor (often equal to 1.0) when generating and supplying power to the grid. However, the accuracy and integration intervals for verification of the power factor are not stated. Also, the fixed value may be changed occasionally, for example for winter and summer, or peak and no-load periods.

Alternatively, the wind farm operator may be required to adjust reactive power consumption or production in order to control the voltage to a set point established for the POI. There may also be requirements on the accuracy of such control and the speed of response.

Accordingly, it is desirable to facilitate the efficient regulation of each of the power generating subsystems with respect to power factor or reactive power control in a coordinated manner without generating negative interactions between the assets (e.g., wind turbines) within the subsystems.

BRIEF DESCRIPTION

Aspects and advantages of the invention will be set forth in part in the following description, or may be obvious from the description, or may be learned through practice of the invention.

In one aspect, the present disclosure is directed to a method for controlling a power generating system that includes at least one power generating subsystem connected to a point of interconnection (POI). The method includes receiving at a subsystem controller of the power generating subsystem, a first data signal corresponding to a feedback signal of an electrical parameter contributed by the power generating subsystem to the POI, the electrical parameter measured remote from the power generating subsystem prior to integration with electrical parameters from other power generating subsystems at the POI. For example, the electrical parameter may be measured at the juncture of the POI and a transmission line that connects the POI to the power generating subsystem. The electrical parameter is one of power factor or reactive power and the first data signal has a first signal fidelity. The method includes receiving a second data signal indicative of the electrical parameter generated at the power generating subsystem, the second data signal measured essentially at the power generating subsystem and having a second signal fidelity that is higher than the first signal fidelity. With the subsystem controller, the method includes generating a correlation value between the first and second data signals by filtering a value difference between the first and second data signals. Then, with the subsystem controller, the correlation value is applied to a setpoint value for the electrical parameter at the POI to generate a modified setpoint value. With the subsystem controller, the method includes using the modified setpoint value to generate a setpoint command for the power generating subsystem and controlling generation of power at the power generating subsystem using the setpoint command to essentially achieve the setpoint value for the electrical parameter at the POI.

In a particular embodiment, the filtering step includes applying a lag filter to the value difference between the first and second data signals.

The power generating system may be variously configured. For example, in on embodiment, the system may include a plurality of the power generating subsystems each having a corresponding subsystem controller, wherein the setpoint value for the electrical parameter is common to each of the subsystem controllers for carrying out the method.

In certain embodiments, the power generating subsystems are not communicatively coupled with regards to the first data signal and the second data signal such that the first and second data signals for a respective one of the power generating subsystems are unknown to the other power generating subsystems.

In one embodiment of the power generating system, the power generating subsystems are individual wind farms connected at the POI and the subsystem controllers are individual wind farm controllers. In this embodiment, the setpoint value for the electrical parameter at the POI is obtained from a utility provider of an electrical grid connected to the POI.

In still another embodiment of the power generating system, the power generating subsystems are individual wind turbines within a wind farm and the subsystem controllers are individual wind turbine controllers. In this embodiment, the first data signal is obtained from a wind farm controller for the wind farm and the setpoint value for the electrical parameter at the POI is obtained from a utility provider of an electrical grid connected to the POI.

The first and second data signal fidelities may include a measure of at least one of a refresh rate, a sensor accuracy, a sensor resolution, or a communication delay.

It should be appreciated that the present invention is not limited to the type or configuration of the power generating subsystems. For example, in addition to wind farms, the power generating subsystems may be one or a combination of a solar power plant, a hydroelectric plant, a hybrid power generation facility, or an energy storage facility.

The present disclosure also encompasses various embodiments of a system for controlling a power generating system, wherein the system includes at least one power generating subsystem connected to a point of interconnection (POI). The power generating subsystem includes a subsystem controller having at least one processor configured to perform a plurality of operations, including: receive a first data signal corresponding to a feedback signal of an electrical parameter contributed by the power generating subsystem to the POI, the electrical parameter measured remote from the power generating subsystem prior to integration with electrical parameters from other power generating subsystems at the POI, the electrical parameter being one of power factor or reactive power and the first data signal having a first signal fidelity; receive a second data signal indicative of the electrical parameter generated at the power generating subsystem, the second data signal measured at the power generating subsystem and having a second signal fidelity that is higher than the first signal fidelity; generate a correlation value between the first and second data signals by filtering a value difference between the first and second data signals; generate a modified setpoint value by applying the correlation value to a setpoint value for the electrical parameter regulated at the POI; use the modified setpoint value to generate a setpoint command for the power generating subsystem; and control power generation at the power generating subsystem using the setpoint command to achieve the setpoint value for the electrical parameter at the POI.

In a particular embodiment of the system, generation of the correlation value includes applying a lag filter to the value difference between the first and second data signals.

In some embodiments, the system may include a plurality of the power generating subsystems each having a corresponding subsystem controller, wherein the parameter setpoint value is common and used by each of the subsystem controllers to perform the plurality of operations.

The system may be configured such that the plurality of power generating subsystems are not communicatively coupled with regards to the first data signal and the second data signal such that the first and second data signals for a respective one of the power generating subsystems are unknown to the other power generating subsystems.

In a particular embodiment, the power generating subsystems include individual wind farms connected at the POI and the subsystem controllers are wind farm controllers. In this embodiment, the setpoint value for the electrical parameter at the POI is obtained from a utility provider of an electrical grid connected to the POI.

In an alternative embodiment, the power generating subsystems are individual wind turbines within a wind farm and the subsystem controllers include individual wind turbine controllers, and wherein the first data signal is obtained from a wind farm controller for the wind farm and the setpoint value for the electrical parameter at the POI is obtained from a utility provider of an electrical grid connected to the POI.

In still other system embodiments, in addition to wind farms, the power generating subsystems may be one or a combination of solar power plants, hydroelectric plants, hybrid power generation facilities, or energy storage facilities.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The term "coupled" and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Generally, the present disclosure is directed to systems and methods for controlling a power generating system having a plurality of power generating subsystems connected to an electrical grid at a point of interconnection (POI), wherein reactive power (consumption or production) or power factor are contributed by the power generating subsystems to the POI to regulate voltage on the grid. In particular, the present disclosure may include a system and method which may facilitate the efficient operation of the power generating subsystems utilizing a low-fidelity electrical parameter signal from a location just prior to integration at the POI as a baseline underpinning the control operations. The signal is a feedback reactive power or power factor signal having a relatively low fidelity. Accordingly, the systems and methods presented herein may utilize high-fidelity electrical parameter signals corresponding to the same characteristics of reactive power or power factor obtained from the power generating subsystems to overcome the undesirable fidelity of the low-fidelity electrical parameter signal. Specifically, the systems and methods may utilize the high-fidelity signal and the low-fidelity signal to model a signal from the POI having sufficient fidelity. The modeled signal may be used to control each of the power generating subsystems, which in turn provide reactive power or power factor to the POI as a means of voltage regulation at the POI. As such, the low-fidelity signal transmitted from the junction of the transmission line from the power generating subsystem and the POI may serve as baseline facilitating the asynchronous control of a number of power generating subsystems without requiring communication or coordination between the power generating subsystems.

Figure 1:
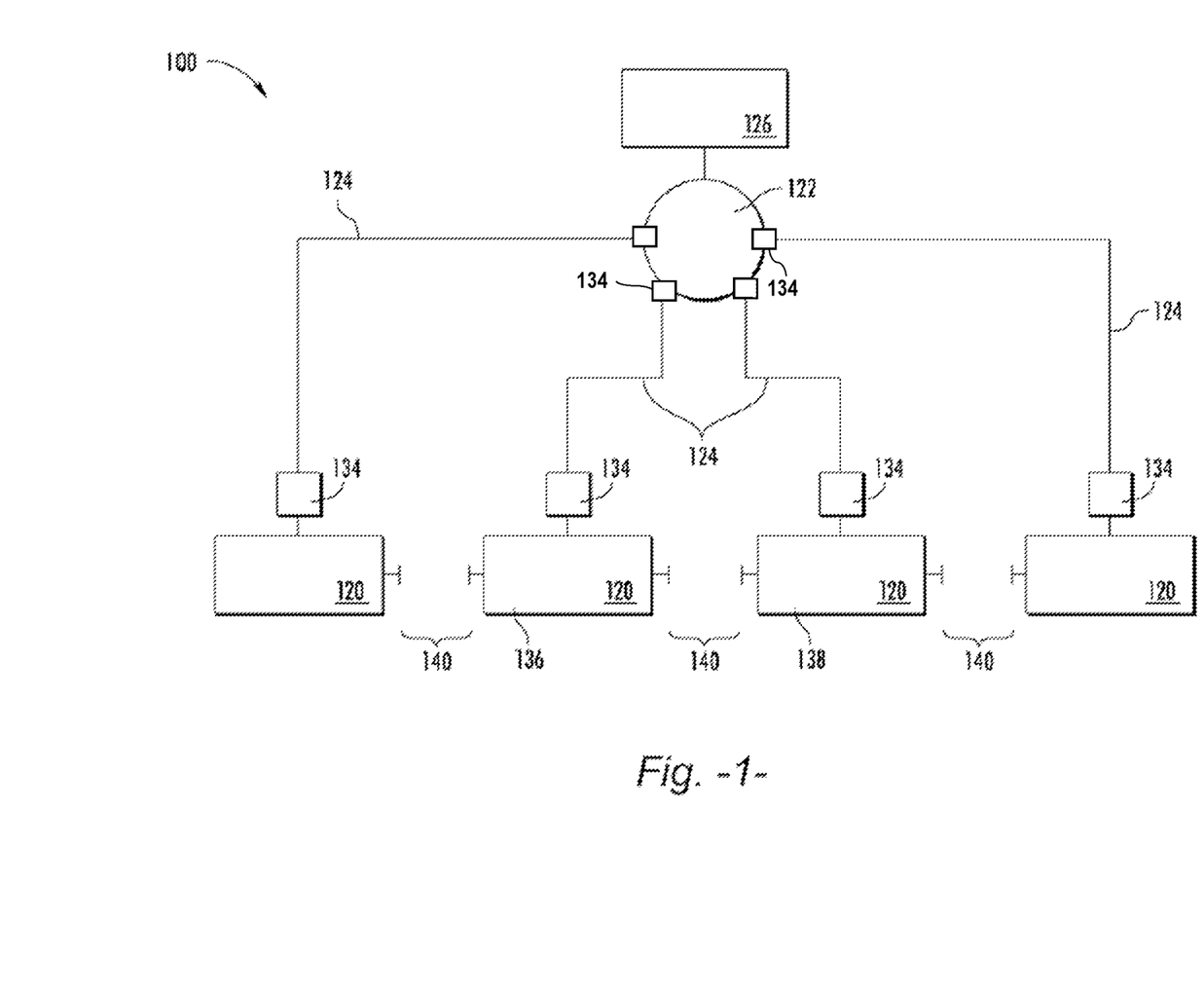
FIG. 1 illustrates a schematic diagram of a power generating system according to the present disclosure.

Referring now to the drawings, FIG. 1 illustrates a schematic diagram of one embodiment a power generating system 100 according to the present disclosure. As depicted in FIG. 1, in an embodiment, the power generating system 100 may include at least one power generating subsystem 120 connected to a POI 122 via a communication (e.g., a power transmission line) link 124. For example, in the illustrated embodiment, the power generating system 100 includes a plurality of the power generating subsystems 120 connected to the POI 122. Further, in such embodiments, the POI 122 may be the point at which the power generating subsystems 120 are electrically coupled to an electrical grid 126.

Figure 2:
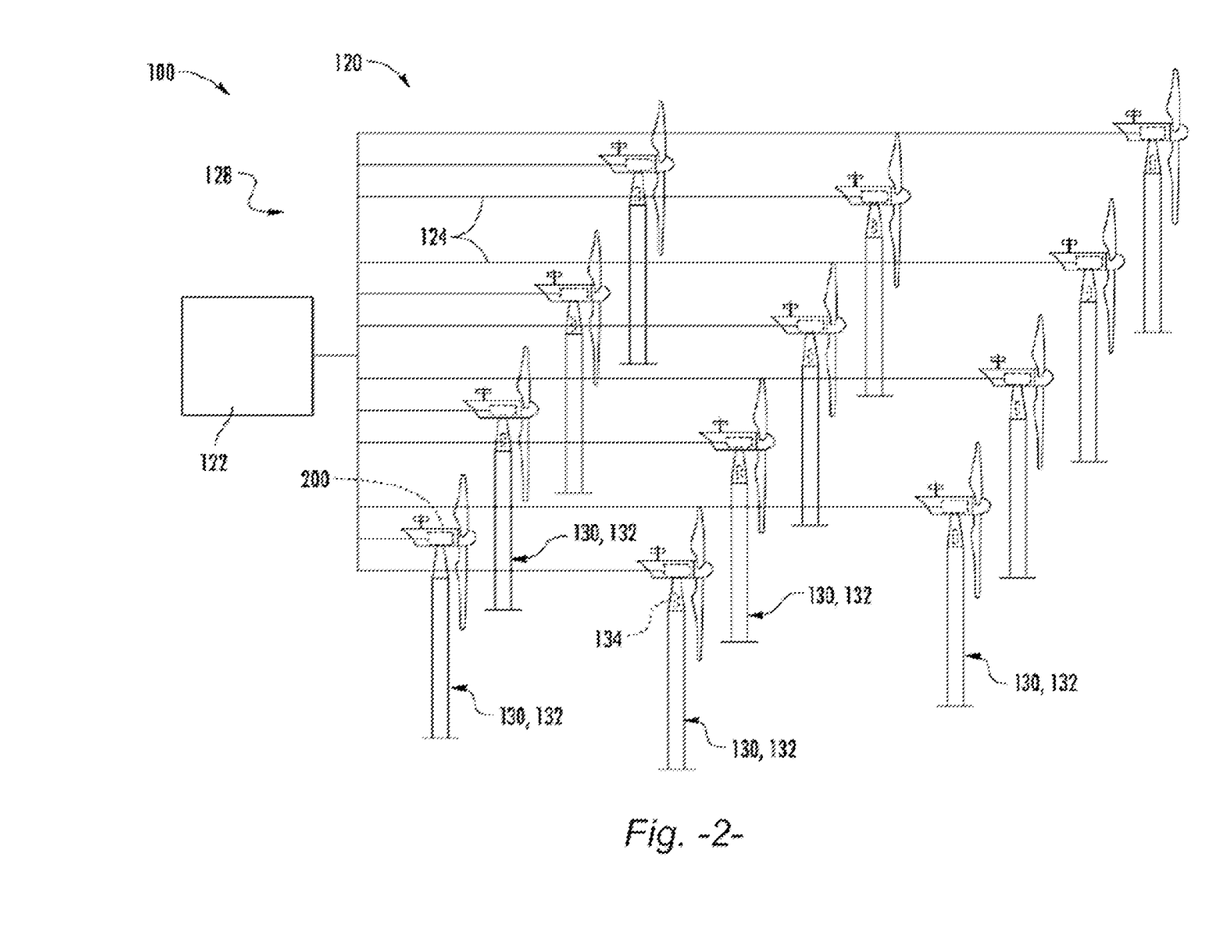
FIG. 2 illustrates a schematic diagram of a wind farm having a plurality of wind turbines according to the present disclosure.

Referring now to FIG. 2, in an embodiment, the power generating subsystem(s) 120 may be configured as a power generating facility 128, such as a wind farm. However, in additional embodiments, the power generating facility 128 may be any other suitable power generating facility, such as a hydro-electric plant, a solar power plant, an energy storage plant, a fossil fuel generator site, and/or a combination thereof, such as a hybrid power generation facility. In an embodiment, as shown, the power generating facility 128 may include a plurality of the power generating assets 130 as described herein, such as a plurality of wind turbines 132. It should be appreciated that the power generating facilities 128 may be coupled to the POI 122 via communication/transmission links 124.

Figure 3:
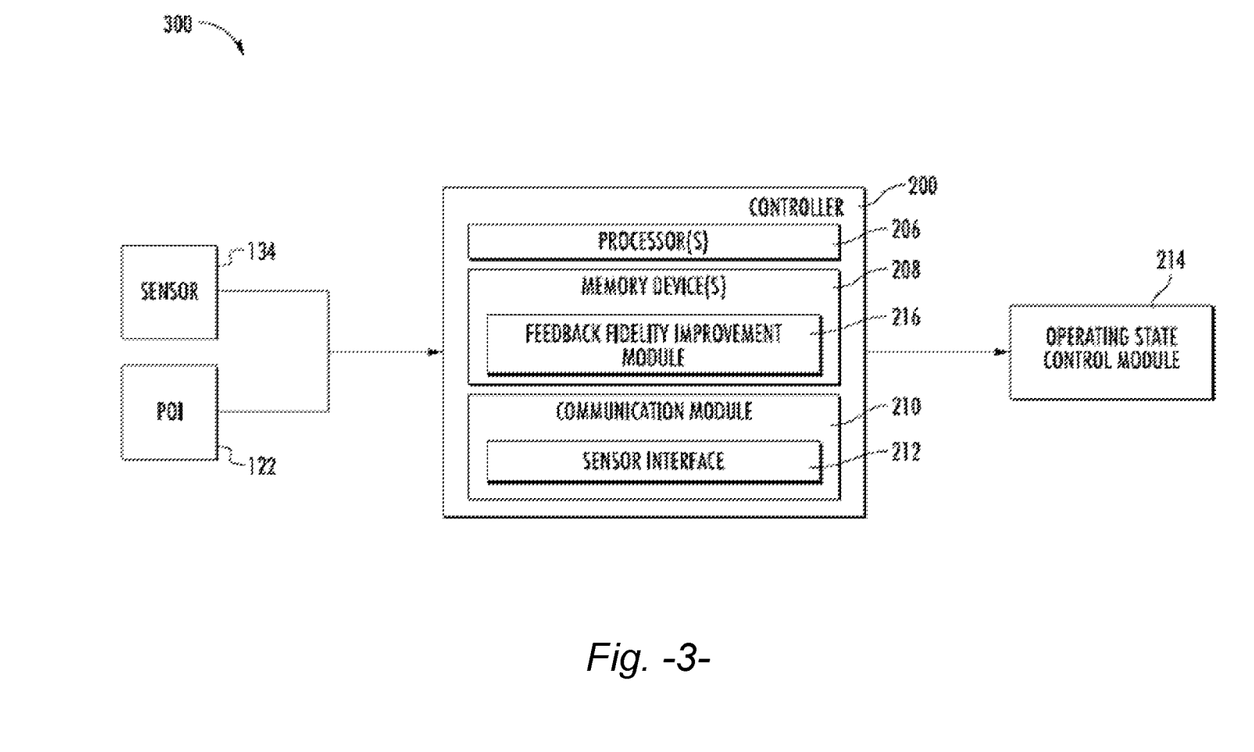
FIG. 3 illustrates a schematic diagram of one embodiment of a controller for use with the power generating system according to the present disclosure.

As depicted in FIGS. 2 and 3, in an embodiment, the power generating subsystem(s) 120 may be configured as the power generating asset 130. For example, the power generating asset 130 as described herein may be configured as a wind turbine 132, solar panels, hydroelectric facilities, tidal generators, waive generators, and/or fossil fuel generators. In such an embodiment, the power generating asset(s) 130 may be coupled to the POI 122 of the power generating facility 128 via communication links 124 and ultimately to the electrical grid 126.

The power generating subsystem(s) 120 may also include a subsystem controller 200. For example, as shown in FIG. 2, when configured as a wind turbine 132, the subsystem controller 200 may be centralized within the nacelle of the wind turbine. However, in other embodiments, the subsystem controller 200 may be located within any other component of the power generating subsystem(s) 120 or at a location outside the power generating subsystem(s) 120. Further, the subsystem controller 200 may be communicatively coupled to any number of the components of the power generating subsystem(s) 120 in order to control the components. As such, the subsystem controller 200 may include a computer or other suitable processing unit. Thus, in several embodiments, the subsystem controller 200 may include suitable computer-readable instructions that, when implemented, configure the subsystem controller 200 to perform various different functions, such as receiving, transmitting and/or executing setpoint commands.

Still referring to FIG. 2, one or more sensors 134 may be provided on the power generating subsystem(s) 120 to monitor the performance of the power generating subsystem(s) 120. It should also be appreciated that, as used herein, the term "monitor" and variations thereof indicates that the various sensors of the power generating subsystem(s) 120 may be configured to provide a direct measurement of the parameters being monitored or an indirect measurement of such parameters. Thus, the sensors described herein may, for example, be used to generate data signals indicative of an electrical parameter at the power generating subsystem(s) 120.

In an embodiment, the sensor(s) 134 may be configured as an operating condition sensor. For example, the sensor(s) 134 may be configured to monitor electrical parameters of the output of the power generating subsystem(s) 120 at the subsystem 120 and at or near the juncture of transmission link or line 124 and the POI 122 (as indicated by the multiple sensors in FIG. 1). As such, the sensor(s) 134 may be a current sensor, voltage sensor, temperature sensors, power sensor, and/or frequency meter that monitors the electrical output of the power generating subsystem(s) 120. For example, the sensor(s) 134 may be configured to generate the data signals indicative of an electrical parameter relating to voltage, current, power (real or reactive), power factor, and/or frequency developed by the power generating subsystem(s) 120.

Referring now to FIGS. 1-4, depictions of multiple embodiments of a system 300 for controlling the power generating system 100 according to the present disclosure are presented. As shown particularly in FIG. 3, a schematic diagram of one embodiment of suitable components that may be included within the subsystem controller 200 is illustrated. For example, as shown, the subsystem controller 200 may include one or more processor(s) 206 and associated memory device(s) 208 configured to perform a variety of computer-implemented functions (e.g., performing the methods, steps, calculations and the like and storing relevant data as disclosed herein). Additionally, the subsystem controller 200 may also include a communications module 210 to facilitate communications between the subsystem controller 200 and the various components of the power generating subsystem(s) 120 and the POI 122. Further, the communications module 210 may include a sensor interface 212 (e.g., one or more analog-to-digital converters) to permit signals transmitted from the sensor(s) 134 to be converted into signals that can be understood and processed by the processors 206. It should be appreciated that the sensor(s) 134 may be communicatively coupled to the communications module 210 using any suitable means. For example, the sensor(s) 134 may be coupled to the sensor interface 212 via a wired connection. However, in other embodiments, the sensor(s) 134 may be coupled to the sensor interface 212 via a wireless connection, such as by using any suitable wireless communications protocol known in the art. Additionally, the communications module 210 may also be operably coupled to an operating state control module 214 configured to change at least one power generating asset operating state in response to the generation of a set point.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the subsystem controller 200 to perform various functions. The various functions may include, but are not limited to, obtaining data signals indicative of an electrical parameter at the POI 122 and the power generating subsystem(s) 120, generating a modeled value for the electrical parameter and generating a setpoint command based on the modeled value, as described herein, as well as various other suitable computer-implemented functions. In an embodiment the generation of the modeled value may be accomplished via a feedback fidelity improvement module 216 of the subsystem controller 200.

Figure 4:
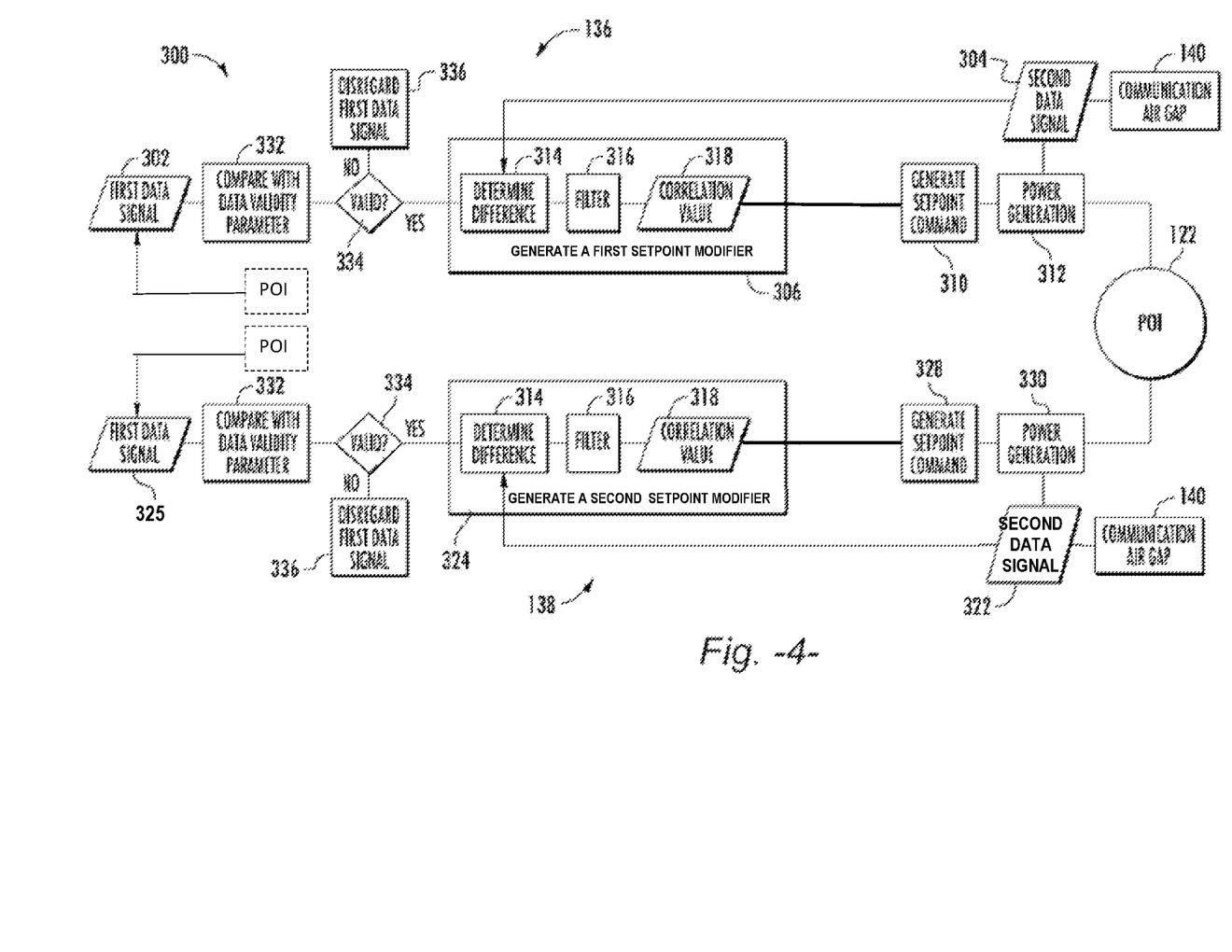
FIG. 4 illustrates a schematic diagram of one embodiment of control logic of a system for controlling a power generating system according to the present disclosure.

Referring still to FIGS. 1-4 and particularly to FIG. 4, in an embodiment, the subsystem controller 200 of the system 300 may be configured to obtain a first data signal 302 indicative of an electrical parameter at the POI 122 but prior to integration of the electrical parameter with other electrical parameters from the other power generating subsystems 120. For example, the electrical parameter may be detected and measured by one or more sensors 134 operatively configured at the POI to detect the electrical parameter at the juncture of the transmission links 124 and the POI. Such sensors 134 may be owned or operated by the utility grid operator. In the particular embodiments set forth herein, the electrical parameter corresponds to reactive power (Q) or power factor (PF). Thus, referring to FIG. 1, it is understood that the first data signals are not the reactive power or power factor values of the POI (which would include and be affected by the (Q) or (PF) contributions from all of the subsystems connected to the POI 122). The data signals 302 correspond to the (Q) or (PF) values contributed by the individual subsystem at the point of connection to the POI and, thus, are measured or determined at or just upstream (e.g. adjacent) of the juncture between the transmission link/line 124 with the POI 122.

In an embodiment, wherein the power generating subsystem(s) 120 is configured as a power generating facility 128, such as a wind farm with multiple wind turbines, a solar plant, a hydroelectric plant, or a hybrid power generation facility, the first data signal 302 may be received from the controller for the respective power generating facility 128 such that the assets within the facility share a common first data signal. In the embodiment, wherein the power generating subsystem(s) 120 is configured as an individual wind turbine 132, the first data signal 302 may be received from the wind farm (via the wind farm controller) and the wind turbines 132 within the wind farm share a common first data signal 302.

In an embodiment, the first data signal 302 may have a first signal fidelity. The first signal fidelity may be a measure of a refresh rate, a sensor accuracy, sensor resolution, and/or a communication delay. For example, the first data signal 302 may be transmitted from at or adjacent the POI 122 at a refresh rate exceeding 10 seconds. Accordingly, the subsystem controller 200 may receive an update reflecting the electrical parameter at the POI 122 once every 14 seconds, for example. In an embodiment, this may be considered to be a low-fidelity signal. It should be appreciated that a difference between the real-time electrical parameter values at or near the POI 122 and the latest reported electrical parameter values may develop and increase as the time elapsed since the last update from the POI 122 increases. In turn, this may result in the power generating subsystem(s) 120 operating at a point of lower efficiency than would be otherwise obtainable with a higher fidelity signal from the POI 122 (e.g. a signal refreshed at a significantly greater frequency). It should further be appreciated that the POI 122 and the power generating subsystem(s) 120 may be owned by different entities. As such, the power generating subsystem(s) 120 may have limited ability to affect the first signal fidelity in order to improve the operating efficiency of the power generating subsystem(s) 120.

Referring still in particular to FIG. 4, in an embodiment, the subsystem controller 200 of the system 300 may be configured to obtain a second data signal 304 indicative of the electrical parameter ((Q) or (PF)) at the power generating subsystem(s) 120. The value of the second data signal 304 reflects the output of the electrical parameter at power generating subsystem 120. It should therefore be appreciated that the value of the second data signal 304 may be some portion of the value of the first data signal 302 for the same electrical parameter.

In an embodiment, the second data signal 304 may be received from the sensor(s) 134 and/or any other suitable component of the power generating subsystem(s) 120. Accordingly, the second data signal may have a second signal fidelity which is higher than the first signal fidelity. For example, in an embodiment, the sensor(s) 134 may generate the second data signal 304 at a refresh rate exceeding twice per second (e.g., a refresh rate of once every 40 milliseconds (ms)). As such, the subsystem controller 200 may receive the second data signal 304 indicating the output of the power generating subsystem 120 essentially continuously. It should be appreciated that due to the higher fidelity of the second data signal 304, the subsystem controller 200 may have a significantly more accurate understanding of the value of electrical parameter at the power generating subsystem 120 than at the POI 122 until such time as an updated first data signal is received by the subsystem controller 200. Therefore, while the subsystem controller 200 may have an accurate understanding of the performance/efficiency of the power generating subsystem 120, the subsystem controller 200, based solely on the first and second data signals 302, 304, may not have an accurate awareness of whether the power generating subsystem 120 is operating efficiently with respect to satisfying the requirements for reactive power or power factor of the POI 122.

In order to utilize the first and second data signals 302, 304 to determine an efficient operating state for the power generating subsystem(s) 120, the subsystem controller 200 may, in an embodiment, be configured, at 306, to generate a first setpoint modifier 318 ("correlation value") for the desired setpoint of the electrical parameter at the POI 122. The subsystem controller 200 may utilize the higher-fidelity second data signal 304 to compensate for the lower-fidelity first data signal 302 to generate the first setpoint modifier 318. This setpoint modifier may then be utilized by the subsystem controller 200 control the power generating subsystem(s) 120.

In an embodiment wherein the first signal fidelity is, for example, limited by the refresh rate of the first data signal 302 transmitted by the POI 122, the first data signal 302 accurately reflects the electrical parameter at the POI 122 only at the instant of transmission, with the accuracy of the reflection potentially decreasing until the next first data signal value is transmitted by the POI 122. Therefore, the higher-fidelity second data signal 304 may be employed to model/predict what the value of the first data signal 302 would have been in the interval between refreshes of the first data signal 302. For example, in an embodiment wherein the first data signal 302 has a refresh rate of 15 seconds and the second data signal 304 has a refresh rate of 50 ms, the first setpoint modifier 318 may be computed in 50 ms intervals until a refreshed first data signal 302 is received after 15 seconds. In other words, because the second data signal 304 may be employed to improve the fidelity of the first data signal 302 in the periods between refreshes, the first data signal 302 may serve as a baseline for the system 300. It should be appreciated that while the preceding explanation was directed to fidelities correlating to the respective refresh rates, the concepts described herein apply equally to fidelities related to other modalities, such as sensor accuracy, sensor resolution, and/or communication delays.

Referring still in particular to FIG. 4, in an embodiment, the subsystem controller 200 may, at 310, generate a set point command for the power generating subsystem(s) 120 based, at least in part, on the first setpoint modifier 318 for the electrical parameter. In response to the setpoint command, the power generating subsystem(s) 120 may, at 312, generate a quantity of power which may be measured by the sensor(s) 134 and/or a component of the power generating subsystem(s) 120.

As further depicted at 314 of FIG. 4, the subsystem controller 200 of the system 300 may, be configured to generate the setpoint modifier 318 by first determining a difference between the value of the first data signal 302 and the value of the second data signal 304. As the value of the first data signal 302 may reflect distortions or losses due to the relatively long transmission line 124 between the power generating subsystems 120 and the POI 122, while the value of the second data signal would not reflect such distortions or losses, the value of the first data signal 302 may be different (e.g., lower) than the value of the second data signal 304.

As depicted at 316, the subsystem controller 200 may filter the difference between the first data signal 302 and the second data signal 304 to generate the setpoint modifier 318 (correlation value). For example, in an embodiment, filtering the difference between the first data signal 302 and the second data signal 304, as determined at step 314, may include applying a lag filter to the difference. In an embodiment, filtering the difference between the first data signal 302 and the second data signal 304, as determined at step 314, may include applying a static (e.g., fixed time constant) lag filter, a dynamic (e.g., changing time constant) lag filter, an exponential filter, a bandpass filter, a low pass filter, a high pass filter, and/or a Kalman filter to the difference.

Referring still to FIG. 4, the system 300 may include a plurality of power generating subsystems (e.g., a plurality of wind farms) coupled to the POI 122, such as a first power generating subsystem 136 and a second power generating subsystem 138. Each of the first and second power generating subsystems 136, 138 may include a subsystem controller 200. The first power generating subsystem 136 may utilize the steps described herein to generate a setpoint command based off the first setpoint modifier 318 using a first data signal 302 and a second data signal 304 that are unique to the first power generating subsystem 136, thereby facilitating, at 312, power generation by the first power generating subsystem 136. Likewise, the second power generating subsystem 138 may utilize the steps described herein to generate a setpoint command 328 based off the second setpoint modifier 318 using a first data signal 325 and a second data signal 322 that are unique to the second power generating subsystem 138, thereby facilitating, at 330, power generation by the second power generating subsystem 138.

As further depicted in FIG. 4, the first and second power generating subsystems 136,138 may not be communicatively coupled with regards to the first data signals 302, 325 and the second data signals 304, 322. In other words, the first and second power generating subsystems 136, 138 may not receive the same broadcast of the first and second data signals and may not communicate with each other the respective outputs of their sensors 134. Instead of requiring a communication link, the system 300 facilitates asynchronous control of the plurality of generating subsystems 120 by requiring each of the generating subsystems 120 to generate the respective setpoint commands based off of their respective modeled values, which are, in turn, baselined off of the broadcasted first data signal that is unique to each subsystem. For example, in an embodiment wherein the plurality of generating subsystems 120 are configured as at least two windfarms, the system 300 does not require a communication link between the windfarms. It should be appreciated that the absence of a communication link between the windfarms may reduce/eliminate costs and/or complexities inherent in coordinating between the windfarms dispersed at a distance one another and/or operated by different entities. It should further be appreciated that the absence of a communication link between wind turbines of a wind farm may reduce/eliminate costs, complexities, and/or bandwidth requirements for a communication infrastructure of the wind farm.

It should further be appreciated that in an embodiment wherein the plurality of power generating subsystems 120 are communicatively decoupled from one another with regards to the data signals received from the respective sensors 134, the plurality of generating subsystems 120 may be communicatively coupled with regards to other aspects of power generation operations. For example, the plurality of generating subsystems 120 may be part of a distributed sensor network wherein readings from distributed environmental sensors are shared amongst the participants while still retaining separation with regards to the respective data signals.

Referring back to FIG. 1, in an embodiment, the communicative decoupling between the plurality of generating subsystems 120 may be considered to be a communication airgap 140. In an embodiment, the establishment of the communication airgap 140 between the first and second power generating subsystems 136, 138 may enhance a cybersecurity posture of the respective power generating subsystems 120 relative to communicatively coupled power generating subsystems. The cybersecurity posture of the power generating subsystems 120 may indicate the relative vulnerability of the power generating subsystems to a cyber-attack. Accordingly, reducing, or eliminating, communication access points to the power generating subsystem(s) 120 may reduce a number of possible avenues for intrusion and thereby increase the cybersecurity posture of the power generating subsystem(s) 120.

Referring back to FIG. 4, in an embodiment, the subsystem controller 200 of the system 300 may be configured, at 332, to compare the first data signal 302 to at least one data validity parameter. For example, in an embodiment, the data validity parameter may include a range of acceptable values of the first data signal, a required refresh interval, a required signal quality, and/or any other combination of parameters selected to indicate a validity state of the first data signal 302. In an embodiment wherein the comparison, at 334, indicates that the first data signal 302 is invalid, the subsystem controller 200 may, at 336, disregard the first data signal 302. In such an embodiment, the subsystem controller 200 may be configured to generate the modeled value using the last known valid first data signal 302. In an additional embodiment, the subsystem controller 200 may be configured to utilize a default first data signal 302 until such time as a valid first data signal 302 may be received.

Figure 5:
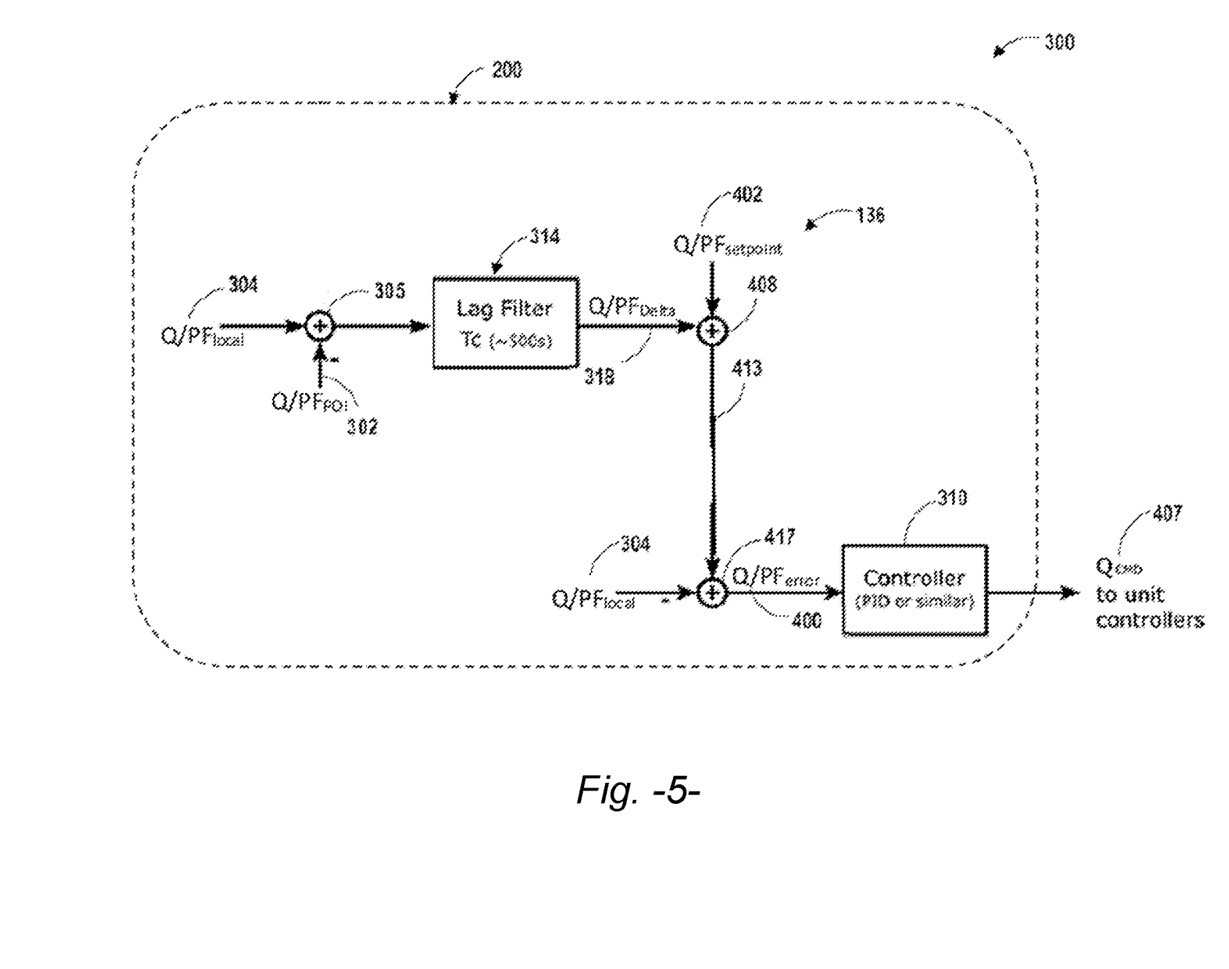
FIG. 5 illustrates a schematic diagram of an embodiment the method and system of FIG. 4 configured for a wind farm; and Repeat use of reference characters in the present specification and drawings is intended to represent the same or analogous features or elements of the present invention.

FIG. 5 is a schematic diagram of a method of operation of the power generating system 300 of FIG. 4 configured for coordinated voltage regulation at the POI by controlling reactive power or power factor from multiple individual wind farms, wherein each of the wind farms functions as a power generating subsystem 136, 138 and includes a wind farm controller functioning as the subsystem controller 200.

Referring to FIG. 5, the first data signal 302 corresponds to the individual reactive power (Q) or power factor (PF) from the wind farm measured at the POI (but not integrated with the combined output of all of the wind farms). The utility provider that operates the electrical grid may dictate a setpoint value 402 ($Q/PF_{setpoint}$) for the reactive power (Q) or power factor (PF) provided by the wind farm. The POI may also be considered as the point of connection with the electrical grid. The second data signal 304 corresponds to the local reactive power (Q) or power factor (PF) from the individual wind farm functioning as the first power generating subsystem 136. At step 305, a difference value between the first 302 and second 304 data signals is generated.

At step 314 in FIG. 5, the difference value obtained at step 305 is filtered to obtain the correlation value ($Q/PF_{Delta}$) 318. The filtering process may include application of a lag filter.

At step 408, the correlation value ($Q/PF_{Delta}$) 318 is applied to the setpoint value 402 ($Q/PF_{setpoint}$) to generate the feedback signal 413 ($Q/PF_{Fdbk}$). At step 417, the feedback signal 413 ($Q/PF_{Fdbk}$) is applied to the second data signal 304 ($Q/PF_{local}$) to generate the reactive power or power factor error signal 400 ($Q/PF_{error}$). This error signal 400 is used at step 310 to generate the reactive power command ($Q_{cmd}$) 407 that is transmitted to the individual wind turbines within the wind farm and used by the individual wind turbine controllers for reactive power or power factor control/response at the wind turbine level.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: 1. A method for controlling a power generating subsystem that is connected to a power generating system at a point of interconnection (POI), the method comprising: receiving at a subsystem controller of the power generating subsystem, a first data signal corresponding to a feedback signal of an electrical parameter contributed by the power generating subsystem to the POI, the electrical parameter measured remote from the power generating subsystem prior to integration with electrical parameters from other power generating subsystems at the POI, the electrical parameter being one of power factor or reactive power and the first data signal having a first signal fidelity; receiving at the subsystem controller, a second data signal indicative of the electrical parameter generated at the power generating subsystem, the second data signal measured at the power generating subsystem and having a second signal fidelity that is higher than the first signal fidelity; with the subsystem controller, generating a correlation value between the first and second data signals by filtering a value difference between the first and second data signals and applying the correlation value to a setpoint value for the electrical parameter at the POI to generate a modified setpoint value; and with the subsystem controller, using the modified setpoint value and the second data signal to generate a setpoint command for the power generating subsystem and controlling generation of power at the power generating subsystem using the setpoint command to achieve the setpoint value for the electrical parameter at the POI.

Clause 2: The method of clause 1, wherein the filtering comprises applying a lag filter to the value difference between the first and second data signals.

Clause 3: The method of any preceding clause, wherein the power generating system comprises a plurality of the power generating subsystems each having a corresponding subsystem controller, wherein the setpoint value for the electrical parameter is common to each of the subsystem controllers for performing the method.

Clause 4: The method of any preceding clause, wherein the plurality of power generating subsystems are not communicatively coupled with regards to the second data signal obtained by each of the subsystem controllers such that the second data signal from a first one of the power generating subsystems is unknown to the subsystem controller of a second one of the power generating subsystems.

Clause 5: The method of any preceding clause, wherein the power generating subsystems are individual wind farms connected at the POI and the subsystem controllers are individual wind farm controllers, and wherein the setpoint value for the electrical parameter at the POI is obtained from a utility provider of an electrical grid connected to the POI.

Clause 6: The method of any preceding clause, wherein the power generating subsystems are individual wind turbines within a wind farm and the subsystem controllers are individual wind turbine controllers, and wherein the first data signal is obtained from a wind farm controller for the wind farm and the setpoint value for the electrical parameter at the POI is obtained from a utility provider of an electrical grid connected to the POI.

Clause 7: The method of any preceding clause, wherein the first and second data signal fidelities comprise a measure of at least one of a refresh rate, a sensor accuracy, a sensor resolution, or a communication delay.

Clause 8: The method of any preceding clause, wherein the power generating subsystem comprises one of a solar power plant, a hydroelectric plant, a hybrid power generation facility, or an energy storage facility.

Clause 9: A system for controlling a power generating subsystem that is connected to a power generating system at a point of interconnection (POI), comprising: a subsystem controller configured with the power generating subsystem, the subsystem controller comprising at least one processor configured to perform a plurality of operations, the plurality of operations comprising: receive a first data signal corresponding to a feedback signal of an electrical parameter contributed by the power generating subsystem to the POI, the electrical parameter measured remote from the power generating subsystem prior to integration with electrical parameters from other power generating subsystems at the POI, the electrical parameter being one of power factor or reactive power and the first data signal having a first signal fidelity; receive a second data signal indicative of the electrical parameter generated at the power generating subsystem, the second data signal measured at the power generating subsystem and having a second signal fidelity that is higher than the first signal fidelity; generate a correlation value between the first and second data signals by filtering a value difference between the first and second data signals; generate a modified setpoint value by applying the correlation value to a setpoint value for the electrical parameter regulated at the POI; use the modified setpoint value to generate a setpoint command for the power generating subsystem; and control power generation at the power generating subsystem using the setpoint command to achieve the setpoint value for the electrical parameter at the POI.

Clause 10: The system of clause 9, wherein generating the correlation value comprises applying a lag filter to the value difference between the first and second data signals.

Clause 11: The system of any preceding clause, further comprising a plurality of the power generating subsystems connected to the POI, each power generating subsystem having a corresponding subsystem controller, wherein the electrical parameter setpoint value is used by each of the subsystem controllers to perform the plurality of operations and is obtained from a utility provider of an electrical grid connected to the POI.

Clause 12: The system of any preceding clause, wherein the plurality of power generating subsystems are not communicatively coupled with regards to the second data signal obtained by each of the subsystem controllers such that the second data signal from a first one of the power generating subsystems is unknown to a second one of the power generating subsystems.

Clause 13: The system of any preceding clause, wherein the power generating subsystems comprise individual wind farms connected at the POI and the subsystem controllers are wind farm controllers, and wherein the setpoint value for the electrical parameter regulated at the POI is obtained from a utility provider of an electrical grid connected to the POI.

Clause 14: The system of any preceding clause, wherein the power generating subsystems comprise individual wind turbines within a wind farm and the subsystem controllers comprise individual wind turbine controllers, and wherein the first data signal is obtained from a wind farm controller for the wind farm and the setpoint value for the electrical parameter regulated at the POI is obtained from a utility provider of an electrical grid connected to the POI.

Clause 15: The system of any preceding clause, wherein the first and second signal fidelities comprise a measure of at least one of a refresh rate, a sensor accuracy, a sensor resolution, or a communication delay.

Clause 16: The system of any preceding clause, wherein the power generating subsystem comprises one of a solar power plant, a hydroelectric plant, a hybrid power generation facility, or an energy storage facility.

What is claimed is:

1. A method for controlling a power generating subsystem that is connected to a power generating system at a point of interconnection (POI), the method comprising:
   receiving at a subsystem controller of the power generating subsystem, a first data signal corresponding to a feedback signal of an electrical parameter contributed by the power generating subsystem to the POI, the electrical parameter measured remote from the power generating subsystem prior to integration with electrical parameters from other power generating subsystems at the POI, the electrical parameter being one of power factor or reactive power and the first data signal having a first signal fidelity;
   receiving at the subsystem controller, a second data signal indicative of the electrical parameter generated at the power generating subsystem, the second data signal measured at the power generating subsystem and having a second signal fidelity that is higher than the first signal fidelity;
   with the subsystem controller, generating a correlation value between the first and second data signals by filtering a value difference between the first and second data signals and applying the correlation value to a setpoint value for the electrical parameter at the POI to generate a modified setpoint value; and
   with the subsystem controller, using the modified setpoint value and the second data signal to generate a setpoint command for the power generating subsystem and controlling generation of power at the power generating subsystem using the setpoint command to achieve the setpoint value for the electrical parameter at the POI.

2. The method of claim 1, wherein the filtering comprises applying a lag filter to the value difference between the first and second data signals.

3. The method of claim 1, wherein the power generating system comprises a plurality of the power generating subsystems each having a corresponding subsystem controller, wherein the setpoint value for the electrical parameter is common to each of the subsystem controllers for performing the method.

4. The method of claim 3, wherein the plurality of power generating subsystems are not communicatively coupled with regards to the second data signal obtained by each of the subsystem controllers such that the second data signal from a first one of the power generating subsystems is unknown to the subsystem controller of a second one of the power generating subsystems.

5. The method of claim 3, wherein the power generating subsystems are individual wind farms connected at the POI and the subsystem controllers are individual wind farm controllers, and wherein the setpoint value for the electrical parameter at the POI is obtained from a utility provider of an electrical grid connected to the POI.

6. The method of claim 3, wherein the power generating subsystems are individual wind turbines within a wind farm and the subsystem controllers are individual wind turbine controllers, and wherein the first data signal is obtained from a wind farm controller for the wind farm and the setpoint value for the electrical parameter at the POI is obtained from a utility provider of an electrical grid connected to the POI.

7. The method of claim 1, wherein the first and second data signal fidelities comprise a measure of at least one of a refresh rate, a sensor accuracy, a sensor resolution, or a communication delay.

8. The method of claim 1, wherein the power generating subsystem comprises one of a solar power plant, a hydroelectric plant, a hybrid power generation facility, or an energy storage facility.

9. A system for controlling a power generating subsystem that is connected to a power generating system at a point of interconnection (POI), comprising:
   a subsystem controller configured with the power generating subsystem, the subsystem controller comprising at least one processor configured to perform a plurality of operations, the plurality of operations comprising:
      receive a first data signal corresponding to a feedback signal of an electrical parameter contributed by the power generating subsystem to the POI, the electrical parameter measured remote from the power generating subsystem prior to integration with electrical parameters from other power generating subsystems at the POI, the electrical parameter being one of power factor or reactive power and the first data signal having a first signal fidelity;
      receive a second data signal indicative of the electrical parameter generated at the power generating subsystem, the second data signal measured at the power generating subsystem and having a second signal fidelity that is higher than the first signal fidelity;
      generate a correlation value between the first and second data signals by filtering a value difference between the first and second data signals;
      generate a modified setpoint value by applying the correlation value to a setpoint value for the electrical parameter regulated at the POI;
      use the modified setpoint value to generate a setpoint command for the power generating subsystem; and
      control power generation at the power generating subsystem using the setpoint command to achieve the setpoint value for the electrical parameter at the POI.

10. The system of claim 9, wherein generating the correlation value comprises applying a lag filter to the value difference between the first and second data signals.

11. The system of claim 9, further comprising a plurality of the power generating subsystems connected to the POI, each power generating subsystem having a corresponding subsystem controller, wherein the electrical parameter setpoint value is used by each of the subsystem controllers to perform the plurality of operations and is obtained from a utility provider of an electrical grid connected to the POI.

12. The system of claim 11, wherein the plurality of power generating subsystems are not communicatively coupled with regards to the second data signal obtained by each of the subsystem controllers such that the second data signal from a first one of the power generating subsystems is unknown to a second one of the power generating subsystems.

13. The system of claim 12, wherein the power generating subsystems comprise individual wind turbines within a wind farm and the subsystem controllers comprise individual wind turbine controllers, and wherein the first data signal is obtained from a wind farm controller for the wind farm and the setpoint value for the electrical parameter regulated at the POI is obtained from a utility provider of an electrical grid connected to the POI.

14. The system of claim 11, wherein the power generating subsystems comprise individual wind farms connected at the POI and the subsystem controllers are wind farm controllers, and wherein the setpoint value for the electrical parameter regulated at the POI is obtained from a utility provider of an electrical grid connected to the POI.

15. The system of claim 9, wherein the first and second signal fidelities comprise a measure of at least one of a refresh rate, a sensor accuracy, a sensor resolution, or a communication delay.

16. The system of claim 9, wherein the power generating subsystem comprises one of a solar power plant, a hydroelectric plant, a hybrid power generation facility, or an energy storage facility.

* * * * *